United States Patent
Koshal et al.

(10) Patent No.: US 11,063,959 B2
(45) Date of Patent: Jul. 13, 2021

(54) SECURE AND SEAMLESS REMOTE ACCESS TO ENTERPRISE APPLICATIONS WITH ZERO USER INTERVENTION

(71) Applicant: COLORTOKENS, INC., Santa Clara, CA (US)

(72) Inventors: Arun Koshal, Santa Clara, CA (US); Vishal Sharma, Santa Clara, CA (US); Raghavendra Thantradi Nagappa, Santa Clara, CA (US); Sagar Singha, Santa Clara, CA (US)

(73) Assignee: COLORTOKENS, INC., Santa Clara, CA (US)

( * ) Notice: Subject to any disclaimer, the term of this patent is extended or adjusted under 35 U.S.C. 154(b) by 222 days.

(21) Appl. No.: 16/211,856

(22) Filed: Dec. 6, 2018

(65) Prior Publication Data
US 2020/0186538 A1    Jun. 11, 2020

(51) Int. Cl.
*H04L 29/06* (2006.01)
*H04L 29/12* (2006.01)

(52) U.S. Cl.
CPC ........ *H04L 63/107* (2013.01); *H04L 61/2557* (2013.01); *H04L 63/08* (2013.01); *H04L 63/105* (2013.01); *H04L 63/205* (2013.01)

(58) Field of Classification Search
None
See application file for complete search history.

(56) References Cited

U.S. PATENT DOCUMENTS

| | | | | |
|---|---|---|---|---|
| 2011/0153853 | A1* | 6/2011 | London | G06F 9/452 709/229 |
| 2014/0109174 | A1* | 4/2014 | Barton | H04W 12/0027 726/1 |
| 2014/0109175 | A1* | 4/2014 | Barton | H04W 12/0027 726/1 |
| 2015/0188949 | A1* | 7/2015 | Mahaffey | H04W 12/37 726/1 |
| 2017/0230334 | A1* | 8/2017 | Newell | H04W 12/03 |
| 2020/0076902 | A1* | 3/2020 | Huang | H04L 63/104 |

* cited by examiner

*Primary Examiner* — Kambiz Zand
*Assistant Examiner* — Arezoo Sherkat
(74) *Attorney, Agent, or Firm* — Barry Choobin; Patent 360LLC (57) ABSTRACT

In secure and seamless remote access to enterprise applications with zero user intervention, a first set of policies is generated at a controller based on a user role. A user device associated with the user role is in an enterprise network. The first set of policies is pushed to the security agent in the user device associated with a user, an enterprise server, and a secure remote access gateway from the controller. Upon determining that the user device moves to a remote network, a secure connection is initiated by the security agent from the user device to the secure remote access gateway. Upon determining by the controller that the user is authenticated for the secure connection, a second set of policies is generated by the controller for the user device, the enterprise server and the secure remote access gateway. The second set of policies is pushed to the devices.

15 Claims, 6 Drawing Sheets

SECURE AND SEAMLESS REMOTE ACCESS TO ENTERPRISE APPLICATIONS WITH ZERO USER INTERVENTION

BACKGROUND

In most of the organizations today, large number of employees work from remote locations. The remote location can be employee's home, airport, hotel, coffee shop or from a different country. These remote employees require access to the enterprise applications. Providing access to the entire network via virtual private network (VPN) solution poses a high security risk to the assets of the organization. VPNs provide network access, once a user working remotely connects to the enterprise VPN gateway, the entire enterprise network becomes accessible to the user. This behavior is not desirable in current security landscape. The remote users must only have access restricted to the required applications only. VPN solutions typically require user intervention and training on client installation, setting up VPN profile, configuring VPN connection etc. There is no seamless way for users to continue to have access to enterprise application even when they move out to a remote network without any manual intervention.

The VPN gateways either authenticate the user or the machine but not both before providing access to the enterprise network. Both machine and user should be authenticated before access to enterprise applications is allowed. The current solutions do not support access control based on user device's physical location. For example, a user may be allowed access to sensitive information present in certain servers when the user accesses it from within the organization, but the same should not be allowed when the user logs-in remotely. If the enterprise network itself was a micro-segmented network with clear firewall rules allowing traffic only from specific IP Addresses, then, when the resource leaves the enterprise network, there is no clear way of learning the remote resource's IP address and enabling access to the server.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. Various embodiments, together with their advantages, may be best understood from the following detailed description taken in conjunction with the accompanying drawings.

DETAILED DESCRIPTION

Embodiments of techniques of secure and seamless remote access to enterprise applications with zero user intervention are described herein. In the following description, numerous specific details are set forth to provide a thorough understanding of the embodiments. A person of ordinary skill in the relevant art will recognize, however, that the embodiments can be practiced without one or more of the specific details, or with other methods, components, materials, etc. In some instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
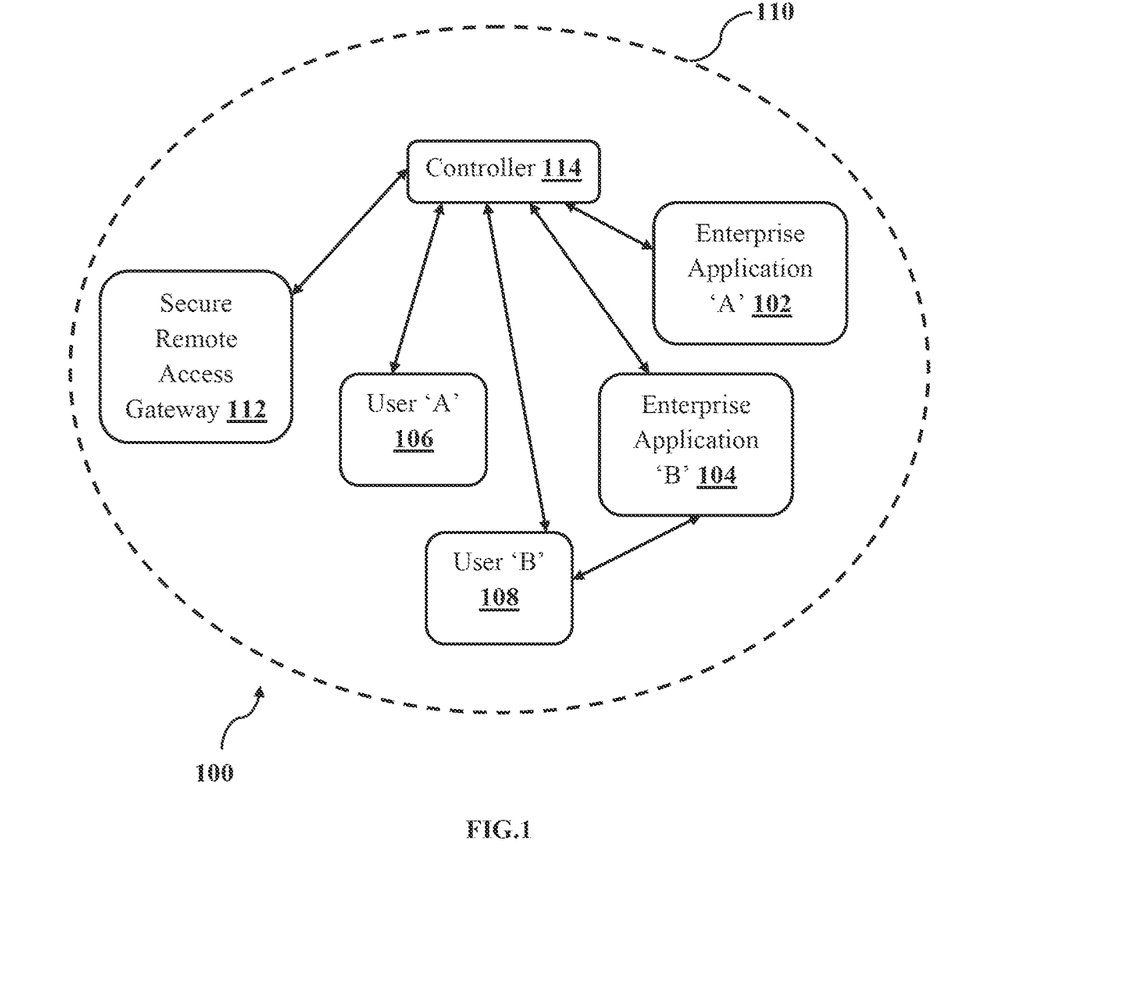
FIG. 1 is a block diagram illustrating high level architecture of a system for secure and seamless remote access to enterprise applications with zero user intervention, according to one embodiment.

FIG. 1 is a block diagram illustrating high level architecture of a system 100 for secure and seamless remote access to enterprise applications with zero user intervention, according to one embodiment. Enterprise application A 102 and enterprise application B 104 are devices or servers which contain critical and sensitive information that needs to be protected from unauthorized access. The enterprise application A 102 and the enterprise application B 104 are hosted in enterprise application servers that contain specialized programs such as enterprise resource planning systems (ERP), customer relationship management (CRM), etc. The enterprise servers hosting such enterprise applications typically reside within the enterprise. User A 106 and user B 108 may use devices such as desktop, laptop, portable computer, tablet, etc. These user devices are used to access the enterprise application A 102 and the enterprise application B 104. The user devices may be moved out from the enterprise network and moved in to the enterprise network. The user A 106 may use a specific user device to access the enterprise application A 102 from within the enterprise network or from outside the enterprise network.

Central identity service enables secure cloud adoption with user provisioning, single sign-on (SSO), and identity life cycle management as a service. Identity management of individual identities, their authentication, authorization, roles and privileges within or across system and enterprise boundaries with the goal of increasing security and productivity while decreasing cost, downtime and repetitive tasks. The identity management includes functionality such as access control, password manager, single sign-on, role based access control, etc. Access control helps define policies and rules for granting access to resources associated with the enterprise applications. A firewall is an appliance (a combination of hardware and software) or an application (software) designed to control the flow of Internet Protocol (IP) traffic to or from a network or electronic equipment. Firewalls are used to examine network traffic and enforce policies based on instructions contained within the firewall's Rule set. Firewalls represent one component of a strategy to combat malicious activities and assaults on computing resources and network-accessible information.

Firewalls are typically categorized as either network firewall or host firewall. The network firewall is most often an appliance attached to a network for the purpose of controlling access to single or multiple hosts, or subnets. The host firewall is most often an application that addresses an individual host (e.g., personal computer) separately. Both types of firewalls (network and host) can be and often are used jointly. A set of policy statements or instructions used by a firewall to filter network traffic is called firewall rule set. A firewall appliance attached to a network for the purpose of controlling traffic flows to and from single or multiple hosts or subnet(s) is the network firewall.

Micro-segmentation refers to the process of segmenting a collision domain into various segments. Micro-segmentation is mainly used to enhance the efficiency or security of the network. Collisions occur when two or more devices make an effort to transmit a signal across the exact same transmission channel at the same time. It can cause complication and thereby unwanted messages. Micro-segmentation is a phenomenon in the direction of fewer users per segment. Micro-segmentation enables the creation of dedicated or private segments, i.e., one user per segment. The key advantage of micro-segmentation is that it lets every node gain access to the entire bandwidth available in the transmission channel rather than sharing the bandwidth with others. So, there is no need for them to content with other users for the available bandwidth. Due to this fact, the chance for collisions to occur is cut down tremendously, particularly in a full-duplex mode, where concurrent transmissions in both directions are enabled. For example, the network 110 may be considered as a micro-segment.

Secure remote access gateway 112 is deployed at the perimeter of the enterprise network and acts as an entry point for the remote user devices enabling access to the protected enterprise application A 102 and the enterprise application B 104. Controller 114 is referred to as a central controller, and the central controller is responsible for various functions such as computing policy for the enterprise application servers, secure remote access gateway and local/remote users. The central controller enables user authentication and also keeps tract of user's location to generate appropriate policy. Here the user A 106 and the user B 108 are within the enterprise network or micro-segment (e.g., the network 110), and therefore direct access of the enterprise application A 102 and the enterprise application B 104 is possible based on the user policy applicable.

Figure 2:
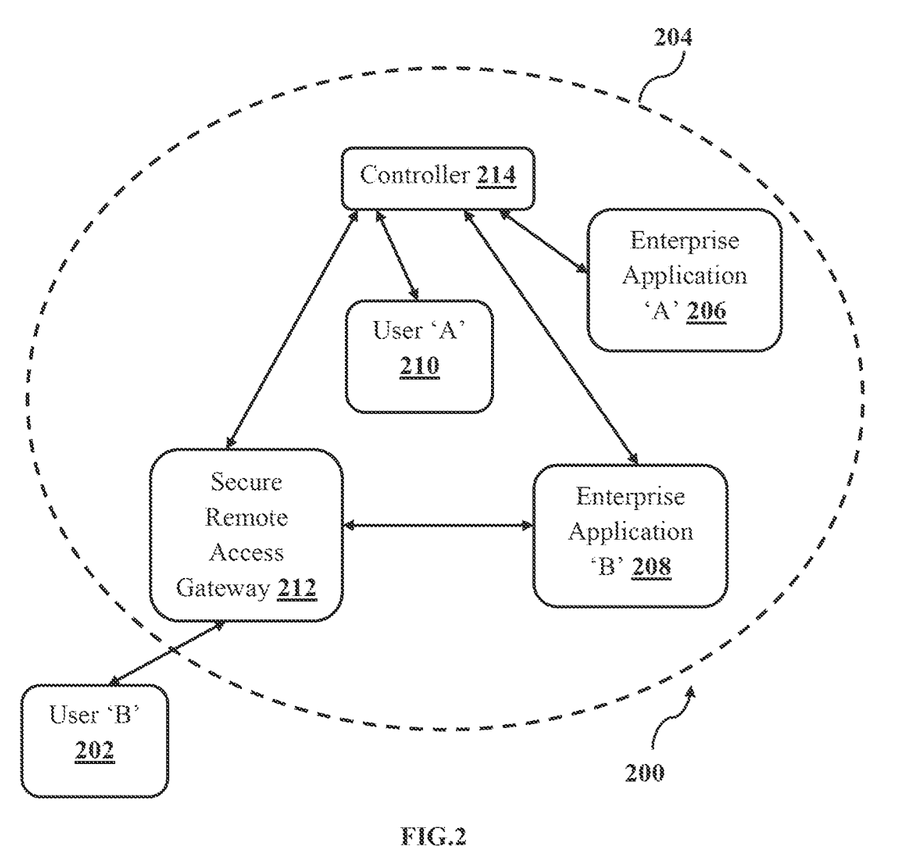
FIG. 2 is a block diagram illustrating high level architecture of a system for secure and seamless remote access to enterprise applications with zero user intervention, according to one embodiment.

FIG. 2 is a block diagram illustrating high level architecture of a system 200 for secure and seamless remote access to enterprise applications with zero user intervention, according to one embodiment. Consider a scenario where user B 202 moves out from enterprise network 204 to a remote network/location, the user B 202 will continue to access the enterprise network 204 seamlessly. The remote access will automatically be available to the user B 202 after success authentication of user's device and the user B 202 will be able to access enterprise applications in the enterprise network 204 provided the user has a valid authentication session. It should be appreciated that user B 202 can be authenticated to the enterprise network 204 from a remote network as well, if the authentication session has expired, using different types of authentication mechanisms. The user B 202 needs to be authenticated inside the enterprise network 204 as well to access the enterprise applications such as enterprise application A 206 and enterprise application B 208. Additionally, the user B 202 will be able to access the enterprise application A 206 and the enterprise application B 208 depending on his/her role and department to which the user B 202 belongs.

Security agent is a thin client that runs on the user devices associated with the user A 210 and the user B 202, secure remote access gateway 212, and enterprise servers associated with the enterprise application A 206 and the enterprise application B 208. The security agent is responsible for detecting the user movement from the enterprise network 204 to a remote location, communicates with central controller 214 to fetch firewall policies and enforce it. The secure remote access gateway 212 accepts secure remote connections from authenticated devices. The secure remote access gateway 212 communicates with the central controller 214 to inform user connections and disconnections, and fetches the firewall policy for the connected users such as the user B 202.

If the user B 202 has a valid authenticated session, the central controller 214 generates appropriate policies to allow the user B 202 to access the required enterprise applications such as the enterprise application A 206 and the enterprise application B 208. These policies are pushed and enforced on the secure remote access gateway 212. If the user B 202 does not have an authenticated session, the secure remote access gateway 212 does not have the policies to allow the user B 202 traffic and the user B 202 is not able to access the enterprise applications. When the user B 202 moves back to the enterprise network 204, the security agent detects the network change and terminates the secure connection with the secure remote access gateway 212. Based on the user's identity the access policies are pushed to the user device and protected application servers so that user can continue to access the enterprise applications. This enables seamless secure access to the enterprise applications regardless of network the user B 202 is connecting from (local or remote), in a way that is completely transparent to the user B 202.

Figure 3:
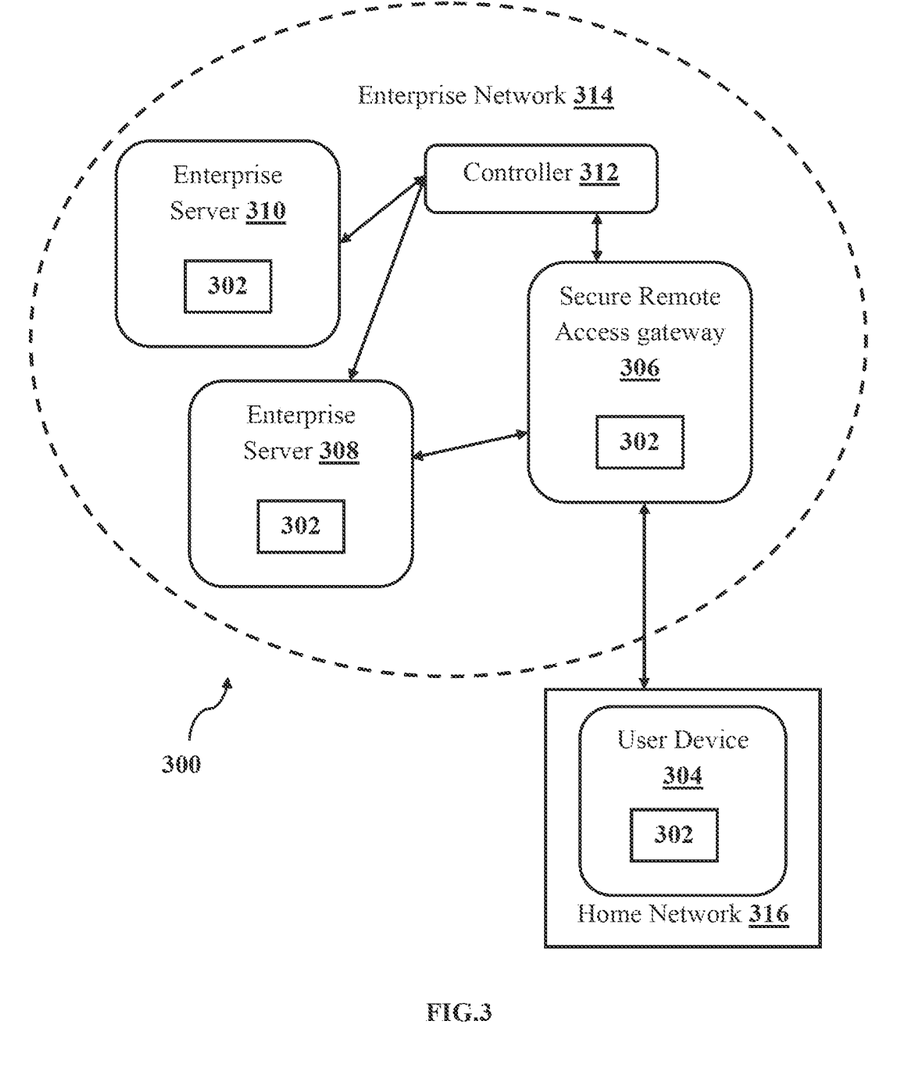
FIG. 3 illustrates a use case for illustrating high level architecture of a system for secure and seamless remote access to enterprise applications with zero user intervention, according to one embodiment.

FIG. 3 illustrates a use case for illustrating high level architecture of a system 300 for secure and seamless remote access to enterprise applications with zero user intervention, according to one embodiment. Security agent 302 is a thin client that runs on user device 304 associated with a user, secure remote access gateway 306, and the enterprise server 308 associated with an enterprise application A and the enterprise server 310 associated with an enterprise application B. The security agent 302 in the enterprise server 308 communicates with the controller 312 to fetch firewall policies and enforce it. The security agent 302 in the user device 304 communicates with the controller to fetch the firewall policy and enforce it. The security agent 302 enables the user authentication with a central identity service, and detects the user device 304 movement from enterprise network 314 to home network 316, and vice versa enabling/disabling secure connection with the secure remote access gateway 306.

The security agent 302 updates routing information on the user device 304, that is in a remote network presently, to forward traffic destined to the enterprise network 314 via the secure remote access gateway 306. The security agent 302 in the secure remote access gateway 306 accepts the secure remote connections from authenticated devices and communicates with the controller 312 to inform about user connections and disconnections. The security agent 302 in the secure remote access gateway 306 communicates with the controller 312 to fetch the firewall policy for the connected user device 304, and enforced firewall policy to allow/deny traffic to the enterprise network 314.

The controller 312 is responsible for policy computation of the enterprise server 308 and the enterprise server 310, the secure remote access gateway 306 and the user device 304 associated with the user. The controller 312 is responsible for user authentication and keeps track of the user's location e.g. user device 304 to generate appropriate policy. When the user device 304 is in the enterprise network 314, the user device 304 authenticates with the controller 312. Based on the user's role and the departments, the controller 312 generates the policies for the user. The established user authentication session expires after an idle timeout.

The controller 312 pushes the policy firewall rules to the security agent 302 running on the user device 304 and to the enterprise server 308 and 310. These policy firewall rules enable the user device 304 to access only the required enterprise application server and restrict access to the application servers not allowed for the user. The security agent 302 gets the secure remote access configuration from the controller 312. This configuration includes secure remote access gateway FQDN, domain names of the enterprise application servers, IP address of enterprise local DNS server, etc. When the user device 304 moves to the remote home network 316, the security agent 302 running on the user device 304 detects the change in the IP address of the network interface and checks the reachability of the enterprise local DNS server to detect whether the user device 304 is still part of the enterprise network 314 or not. If the DNS server is not reachable, the security agent 302 decides that the user device 304 is in a remote location.

If the user device 304 location is remote, the security agent 302 initiates a secure connection with the secure remote access gateway 306 and a connection is established after successful device certificate validation. The user device 304 also authenticates the secure remote access gateway certificate. After successful connection, the secure remote access gateway 306 informs the controller 312 about the new connection and creates a path so that security agent 302 on the remote user device 304 can reach the controller 312. If a valid user authentication session exists for the user device 304, the controller 312 generates the policy for the user device 304 and pushes it to the secure remote access gateway 306.

The controller 312 also removes the access policy on the user device 304 which was enforced on it in the enterprise network 314. The controller 312 also determines which enterprise application servers 308 or 310 are allowed access from the remote user device 304 and pushes a policy rule to those enterprise servers to accept traffic from the secure remote access gateway 306 internal network interface. If the user device 304 does not have a valid authentication session, the user device 304 authenticates with the controller 312 which triggers the controller 312 to generate policy rules to send to the secure remote access gateway 306. When the user device 304 accesses an enterprise application using the domain name, the name for the domain is resolved with the enterprise DNS server and traffic to the enterprise application is forwarded to the secure remote access gateway 306 over the secure connection. When the secure remote access gateway receives traffic from the user device 304, it matches the traffic with the policy firewall rules.

If the traffic matches a policy rule, the secure remote access gateway 306 performs source network address translation (NAT) and forwards the traffic to the target enterprise server 308 or 310. When the user device 304 moves back to the enterprise network 314, the security agent 302 detects the movement and disconnects the secure connection with the secure remote access gateway 306. The secure remote access gateway 306 informs the controller 312 about the disconnection. The controller 312 recalculates the policies for the secure remote access gateway 306 and removes the rules to allow traffic from the remote user device 304. The user device 304 connects to the controller 312 directly in the enterprise network 314, the controller 312 generates the policies for the user device 304 to allow traffic to the enterprise servers 308 and 310.

Figure 4:
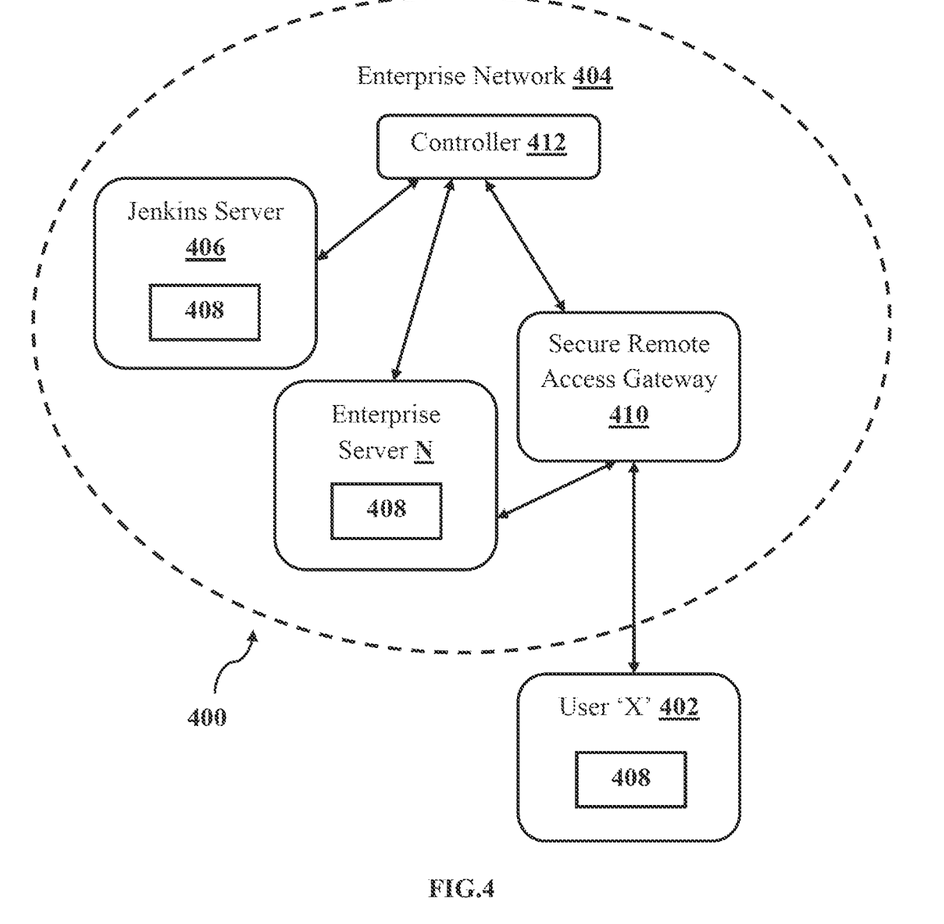
FIG. 4 illustrates a use case for illustrating high level architecture of a system for secure and seamless remote access to enterprise applications with zero user intervention, according to one embodiment.

FIG. 4 illustrates a use case for illustrating high level architecture of a system 400 for secure and seamless remote access to enterprise applications with zero user intervention, according to one embodiment. Let's assume that user X 402 belongs to Engineering department in enterprise network 404. Based on the enterprise policy, user X 402 has access to Jenkins server 406, which is an HTTPS based application server and listens on TCP port 443. In the enterprise network 404, the user X 402 authenticates with Controller 412. If the authentication of the user X 402 is successful, the Controller 412 pushes the following policy rules such as, User2 machine
    Outbound TCP/443 to <Jenkins server 406 IP address>
    Allow
Jenkins server
    Inbound TCP/443 from <User X 402 IP address> Allow to the user X 402 machine and the Jenkins server 406. The policy rules are identified based on user's identity. All the machines including the servers have white-list policy, that is, everything is blocked except the traffic for which there is an explicit allow rule. The user X 402 authentication session expires after a configured idle time interval. Let's assume that the user X 402 moves out of the enterprise network 404 and connects from a remote network.

When the user X 402 moves out, security agent 408 running on the user X 402 machine automatically triggers a secure tunnel with the secure remote access gateway 410 after mutual transport layer security (TLS) authentication using machine certificates. The secure remote access gateway 410 allows user X 402 machine access to Controller 412 only. It also informs the Controller 412 about the movement of user X 402 to the remote network. If the user X 402 authentication session with the Controller 412 has expired then the user X 402 needs to authenticate itself again with the Controller 412. If the user X 402 has a valid authentication session, the Controller 412 generates following policy rules for the Jenkins server 406, the Secure Remote Access Gateway (SRAG) 410 and User X 402 machine:

Jenkins server:
    Remove "Inbound TCP/443 from <User2 IP address>
    Allow"
    Inbound TCP/443 from <SRAG interface IP address>
    Allow
SRAG
    Forward TCP/443 from <User2 tunnel IP> to <Jenkins IP> Allow
User2 machine
    Remove "Outbound TCP/443 to <Jenkins IP address>
    Allow"

When the user X 402 is part of enterprise network 404, the micro-segmentation policy is enforced on the user X 402 machine, but when the user X 402 connects from a remote network, the micro-segmentation policies are enforced on the Secure Remote Access Gateway 410. Policies for users are derived based on the Group or Department to which the user belongs. For each application that a group/department user has access to, an outbound rule is pushed to the user's machine to allow access to that server and an inbound rule is pushed on the server to allow traffic on given port from the user's machine.

The policy computation for a user such as user X 402 takes place on one of the following events such as when the user X 402 logs in and logs out from the controller 412, when the user X 402 moves in and moves out of the enterprise network 404, and when there is change in the configured policy such as addition or deletion of access rules. The security agent 408 polls for the policy periodically. As soon as there is a change, incremental policy is downloaded to the security agent 408. The various types of policies include output policy, input policy/rules and forward policy. On user X 402 machine, the output policy is enforced to allow access to required servers. These policies are IP, port and protocol based rules. The input rules are enforced on the server machine's to allow inbound access from the user X 402 or the Secure Remote Access Gateway 410. Forwarding policy is enforced on the Secure Remote Access Gateway 410 to allow traffic from user X 402 machine to the enterprise application servers such as the Jenkins server 406. The Secure Remote Access Gateway 410 does source network address port translation (NAPT) while forwarding the packets to internal enterprise servers such as the Jenkins server 406. Therefore, the internal enterprise server network does not see the actual IP address of the remote user machine. The Secure Remote Access Gateway translates the source IP address (that is, the remote user machine's IP address) with its internal interface IP address.

Figure 5:
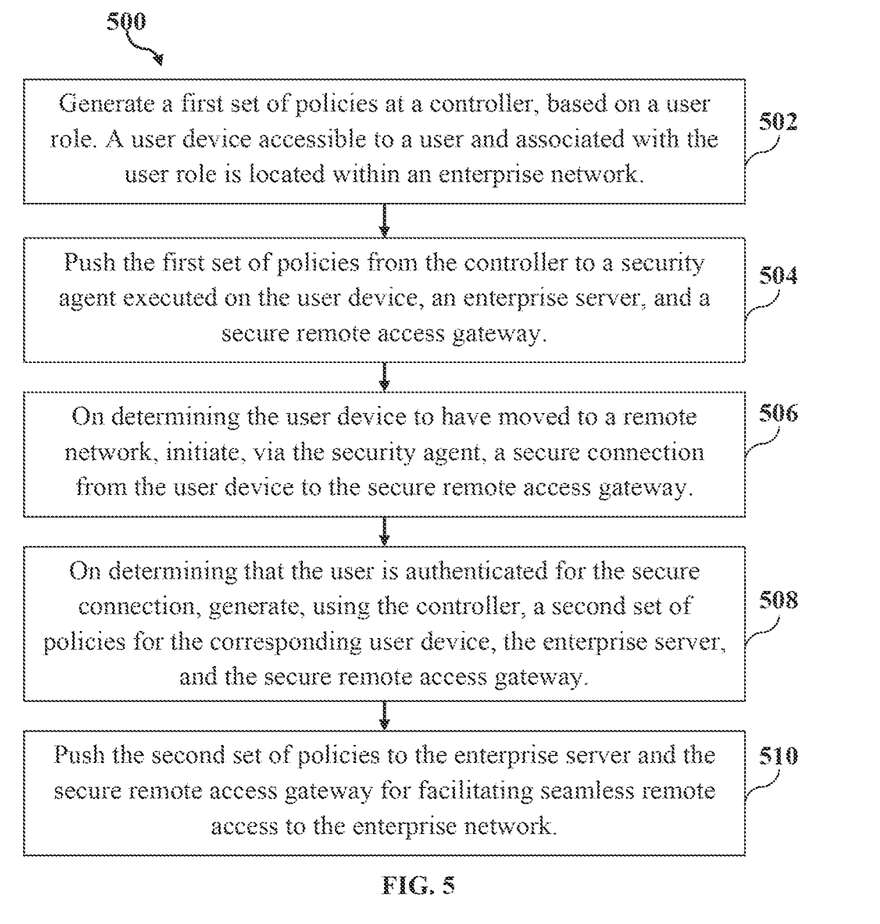
FIG. 5 is flowchart illustrating method of secure and seamless remote access to enterprise applications with zero user intervention, according to one embodiment.

FIG. 5 is flowchart 500 illustrating method for secure and seamless remote access to enterprise applications with zero user intervention, according to one embodiment. At 502, a first set of policies is generated at a controller based on a user role. A user device associated with the user role is in an enterprise network. At 504, the first set of policies is pushed to the security agent in the user device associated with a user, an enterprise server, and a secure remote access gateway from the controller. At 506, upon determining that the user device moves to a remote network, a secure connection is initiated by the security agent from the user device to the secure remote access gateway. At 508, upon determining by the controller that the user is authenticated for the secure connection, a second set of policies is generated by the controller for the user device associated with the user, the enterprise server and the secure remote access gateway. At 510, the second set of policies is pushed to the enterprise server, and the secure remote access gateway for seamless remote access to the enterprise network.

Some embodiments may include the above-described methods being written as one or more software components. These components, and the functionality associated with each, may be used by client, server, distributed, or peer computer systems. These components may be written in a computer language corresponding to one or more programming languages such as functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits (ASICs), programmable logic devices (PLDs) and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 6:
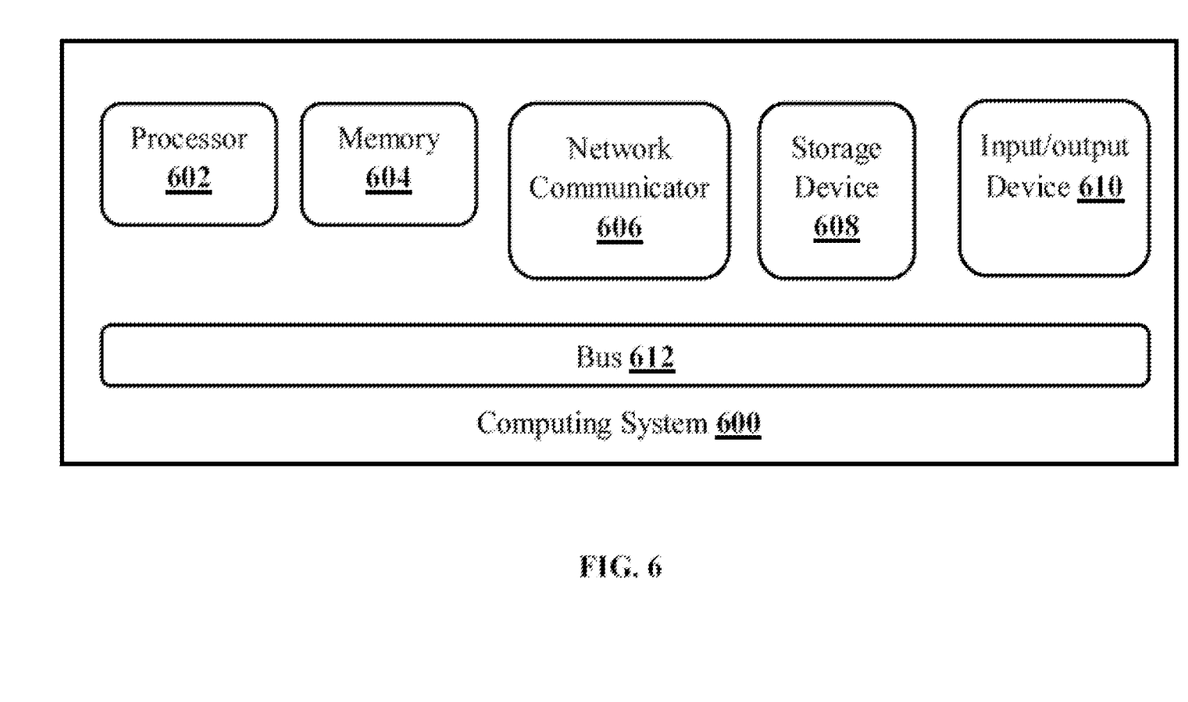
FIG. 6 is a block diagram of an exemplary computer system, according to one embodiment.

FIG. 6 is a block diagram illustrating a computing system 600 consistent with implementations of the current subject matter. As shown in FIG. 6, the computing system 600 can include a processor 602, a memory 604, network communicator 606, a storage device 608, and input/output devices 610. The processor 602, the memory 604, network communicator 606, the storage device 608, and the input/output device 610 can be interconnected via a system bus 612. The processor 602 is capable of processing instructions for execution within the computing system 600. Such executed instructions can implement one or more components of, for example, application A. In some example embodiments, the processor 602 can be a single-threaded processor. Alternately, the processor 602 can be a multi-threaded processor. The processor 602 is capable of processing instructions stored in the memory 604 and/or on the storage device 608 to display graphical information for a user interface provided via the input/output device 610.

The memory 604 is a computer readable medium such as volatile or non-volatile that stores information within the computing system 600. The memory 604 can store instructions and/or other data associated with the processes disclosed herein. The storage device 608 is capable of providing persistent storage for the computing system 600. The storage device 608 can be a hard disk device, an optical disk device, or a tape device, or other suitable persistent storage means. The input/output device 610 provides input/output operations for the computing system 600. In some example embodiments, the input/output device 610 includes a keyboard and/or pointing device. In various implementations, the input/output device 610 includes a display unit for displaying graphical user interfaces.

According to some example embodiments, the input/output device 710 can provide input/output operations for a network device. For example, the input/output device 710 can include Ethernet ports or other networking ports to communicate with one or more wired and/or wireless networks (e.g., a local area network (LAN), a wide area network (WAN), the Internet).

In some example embodiments, the computing system 600 can be used to execute various interactive computer software applications that can be used for organization, analysis and/or storage of data in various formats. Alternatively, the computing system 600 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. Upon activation within the applications, the functionalities can be used to generate the user interface provided via the input/output device 610. The user interface can be generated and presented to a user by the computing system 600 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitory, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer-implemented system for providing a user with secured and seamless access to enterprise applications executed on an enterprise application server, said system comprising:
    at least one user device accessible to said user, said user device configured to be connected to said enterprise application server via an enterprise local DNS server, said user device further configured to be connected to said enterprise application server alternatively via a remote access gateway;
    a controller module communicably coupled to said enterprise application server, said controller module configured to store micro-segmentation policies applicable to communication between said user device and said enterprise application server;
    and wherein said controller module:
        reconfigures said micro-segmentation policies and generates reconfigured micro-segmentation policies, in response to said user device connecting to said enterprise application server via said remote access gateway;

pushes said reconfigured micro-segmentation policies onto said user device via a new communication path established by said remote access gateway, and facilitates communication between said user device and said enterprise application server, in line with said reconfigured micro-segmentation policies, until said user device is connected to said enterprise application server via said remote access gateway;

enforces said micro-segmentation policies on said user device and said enterprise application server, until said user device is connected to said enterprise application server via said enterprise local DNS server, and enforces said reconfigured micro-segmentation policies on said user device, said enterprise application server, and said remote access gateway, in response to said user device connecting to said enterprise application server via said remote access gateway, instead of said enterprise local DNS server; and selectively switches between enforcing said micro-segmentation policies on said user device and said enterprise application server, and enforcing said reconfigured micro-segmentation policies on said user device, said enterprise application server, and said remote access gateway, in response to said user device switching between said enterprise local DNS server and said remote access gateway respectively for connecting to said enterprise application server.

2. The system as claimed in claim 1, wherein said user device, on connecting to said enterprise server via said remote access gateway, triggers said remote access gateway to establish said new communication path between said user device and said controller module.

3. The system as claimed in claim 1, wherein said remote access gateway communicates with said controller module over said new communication path and fetches said reconfigured micro-segmentation policies applicable to said user device, said enterprise application server, and said remote access gateway.

4. The system as claimed in claim 1, wherein said controller module identifies said user device as connected to said enterprise application server via said remote access gateway, in an event said enterprise local DNS server is determined to be unreachable to said user device.

5. The system as claimed in claim 1, wherein said controller module is further configured to replace said micro-segmentation policies with said reconfigured micro-segmentation policies, in an event said user device is identified as connected to said enterprise application server via said remote access gateway, instead of said enterprise local DNS server.

6. The system as claimed in claim 5, wherein said controller module is further configured to replace said reconfigured micro-segmentation policies with said micro-segmentation policies, in an event said user device is identified as connected to said enterprise application server via said enterprise local DNS server, instead of said remote access gateway.

7. The system as claimed in claim 1, wherein said micro-segmentation policies are selected from a group consisting of input policies, output policies, and forward policies.

8. A computer-implemented method for providing a user with secured and seamless access to enterprise applications executed on an enterprise application server, said method comprising the following computer-implemented steps:

configuring a user device accessible to said user, to connect to said enterprise application server via an enterprise local DNS server, and further configuring said user device to be connected to said enterprise application server alternatively via a remote access gateway;

communicably coupling a controller module to said enterprise application server, and storing on said controller module, micro-segmentation policies applicable to communication between said user device and said enterprise application server;

triggering said controller module to reconfigure said micro-segmentation policies and generate reconfigured micro-segmentation policies in response to said user device connecting to said enterprise application server via said remote access gateway;

triggering said controller module to push said reconfigured micro-segmentation policies onto said user device via a new communication path established by said remote access gateway, and facilitate communication between said user device and said enterprise application server, in line with said reconfigured micro-segmentation policies, until said user device is connected to said enterprise application server via said remote access gateway;

triggering said controller module to enforce said micro-segmentation policies on said user device and said enterprise application server, until said user device is connected to said enterprise application server via said enterprise local DNS server;

triggering said controller module to enforce said reconfigured micro-segmentation policies on said user device, said enterprise application server, and said remote access gateway, in response to said user device connecting to said enterprise application server via said remote access gateway, instead of said enterprise local DNS server; and triggering said controller module to selectively switch between enforcing said micro-segmentation policies on said user device and said enterprise application server, and enforcing said reconfigured micro-segmentation policies on said user device, said enterprise application server, and said remote access gateway, in response to said user device switching between said enterprise local DNS server and said remote access gateway respectively for connecting to said enterprise application server.

9. The method as claimed in claim 8, wherein said method further includes the step of triggering, by said user device, said remote access gateway to establish said new communication path between said user device and said controller module, in response to said user device connecting to said enterprise application server via said remote access gateway, instead of said enterprise local DNS server.

10. The method as claimed in claim 8, wherein said method further includes the step of configuring said remote access gateway to communicate with said controller module over said new communication path and fetch said reconfigured micro-segmentation policies applicable to said user device, said enterprise application server, and said remote access gateway.

11. The method as claimed in claim 8, wherein said method further includes the step of causing said controller module to identify said user device as connected to said enterprise application server via said remote access gateway, in an event said enterprise local DNS server is unreachable to said user device.

12. The method as claimed in claim 8, wherein method further includes the step of configuring said controller module to replace said micro-segmentation policies with said reconfigured micro-segmentation policies, in an event said user device is identified as connected to said enterprise application server via said remote access gateway, instead of said enterprise local DNS server.

13. The method as claimed in claim 12, wherein method further includes the step of configuring said controller module to replace said reconfigured micro-segmentation policies with said micro-segmentation policies, in an event said user device is identified as connected to said enterprise application server via said enterprise local DNS server, instead of said remote access gateway.

14. A non-transitory computer-readable storage medium having computer-executable instructions stored thereon, said computer-executable instructions, when executed by a computer processor, cause said processor to:
- configure a user device accessible to a user, to connect to an enterprise application server via an enterprise local DNS server, and further configure said user device to be connected to said enterprise application server alternatively via a remote access gateway;
- communicably couple a controller module to said enterprise application server, and store on said controller module, micro-segmentation policies applicable to communication between said user device and said enterprise application server;
- trigger said controller module to reconfigure said micro-segmentation policies and generate reconfigured micro-segmentation policies in response to said user device connecting to said enterprise application server via said remote access gateway;
- trigger said controller module to push said reconfigured micro-segmentation policies onto said user device via a new communication path established by said remote access gateway, and facilitate communication between said user device and said enterprise application server, in line with said reconfigured micro-segmentation policies, until said user device is connected to said enterprise application server via said remote access gateway; and
- trigger said controller module to enforce said micro-segmentation policies on said user device and said enterprise application server, until said user device is connected to said enterprise application server via said enterprise local DNS server;
- trigger said controller module to enforce said reconfigured micro-segmentation policies on said user device, said enterprise application server, and said remote access gateway, in response to said user device connecting to said enterprise application server via said remote access gateway, instead of said enterprise local DNS server; and
- trigger said controller module to selectively switch between enforcing said micro-segmentation policies on said user device and said enterprise application server, and enforcing said reconfigured micro-segmentation policies on said user device, said enterprise application server, and said remote access gateway, in response to said user device switching between said enterprise local DNS server and said remote access gateway respectively for connecting to said enterprise application server.

15. The computer-executable instructions as claimed in claim 14, wherein said computer-executable instructions further cause said processor to:
- trigger said remote access gateway to establish said new communication path between said user device and said controller module, in response to said user device connecting to said enterprise application server via said remote access gateway, instead of said enterprise local DNS server;
- configure said remote access gateway to communicate with said controller module over said new communication path and fetch said reconfigured micro-segmentation policies applicable to said user device, said enterprise application server, and said remote access gateway;
- trigger said controller module to identify said user device as connected to said enterprise application server via said remote access gateway, in an event said enterprise local DNS server is unreachable to said user device;
- configure said controller module to replace said micro-segmentation policies with said reconfigured micro-segmentation policies, in an event said user device is identified as connected to said enterprise application server via said remote access gateway, instead of said enterprise local DNS server; and
- configure said controller module to replace said reconfigured micro-segmentation policies with said micro-segmentation policies, in an event said user device is identified as connected to said enterprise application server via said enterprise local DNS server, instead of said remote access gateway.

* * * * *